United States Patent
Yang (10) Patent No.: US 9,876,371 B2
(45) Date of Patent: Jan. 23, 2018

(54) BATTERY PACK AND DRIVING METHOD THEREOF

(71) Applicant: SAMSUNG SDI CO., LTD., Yongin-si, Gyeonggi-do (KR)

(72) Inventor: Sungwoo Yang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 103 days.

(21) Appl. No.: 14/845,069

(22) Filed: Sep. 3, 2015

(65) Prior Publication Data

US 2016/0241051 A1    Aug. 18, 2016

(30) Foreign Application Priority Data

Feb. 16, 2015  (KR) .......................... 10-2015-0023429

(51) Int. Cl.
| | |
|---|---|
| H02J 7/00 | (2006.01) |
| H01M 10/46 | (2006.01) |
| H01M 10/44 | (2006.01) |
| H01M 10/42 | (2006.01) |
| H01M 10/48 | (2006.01) |

(52) U.S. Cl.
CPC ....... *H02J 7/0029* (2013.01); *H01M 10/4257* (2013.01); *H01M 10/44* (2013.01); *H01M 10/46* (2013.01); *H01M 10/48* (2013.01); *H02J 7/007* (2013.01); *H02J 7/0021* (2013.01); *H02J 7/0026* (2013.01); *H02J 2007/004* (2013.01); *H02J 2007/0067* (2013.01)

(58) Field of Classification Search
CPC .... H02J 7/007; H02J 7/0021; H02J 2007/004; H02J 7/0026; H02J 7/0047; H02J 2007/0067; H02J 7/00; H02J 2007/0037; H01M 10/4257; H01M 10/48; H01M 10/46; H01M 10/44
See application file for complete search history.

(56) References Cited

U.S. PATENT DOCUMENTS 6,172,482 B1 * 1/2001 Eguchi ..................... H02H 7/18
  320/134
7,436,644 B2 * 10/2008 Nagai ..................... H01H 71/26
  324/418

(Continued)

FOREIGN PATENT DOCUMENTS

| KR | 10-2012-0083850 A | 7/2012 |
| KR | 10-2013-0015353 A | 2/2013 |

*Primary Examiner* — Helen Rossoshek
(74) *Attorney, Agent, or Firm* — Lewis Roca Rothgerber Christie LLP (57) ABSTRACT

A battery pack includes: a battery to be charged; a first terminal part including a positive terminal coupled to a positive pole of the battery and a negative terminal coupled to a negative pole of the battery; a charge control switch and a discharge control switch between the positive pole and the positive terminal of the battery; and a protector to measure a voltage of the first terminal part, to control the charge control switch and the discharge control switch to operate normally when the voltage of the first terminal part is greater than or equal to a voltage of a reference power, and to control the charge control switch and the discharge control switch to be turned off when the voltage of the first terminal part is less than the voltage of the reference power.

12 Claims, 5 Drawing Sheets

(56) References Cited

U.S. PATENT DOCUMENTS

| | | | |
|---|---|---|---|
| 7,701,177 B2* | 4/2010 | Liu | H02J 7/0075 320/132 |
| 7,737,660 B2* | 6/2010 | Yun | H02J 7/0004 320/132 |
| 8,159,184 B2* | 4/2012 | Emori | B60L 3/0046 307/10.1 |
| 8,217,628 B2* | 7/2012 | Yang | H02J 7/0031 320/134 |
| 8,368,353 B2* | 2/2013 | Akiba | H02J 7/0016 180/65.1 |
| 8,575,940 B2* | 11/2013 | Yugou | B60L 3/04 307/10.1 |
| 9,184,615 B2* | 11/2015 | Kim | H02J 7/007 |
| 2008/0106234 A1* | 5/2008 | Yun | H02J 7/0013 320/124 |
| 2009/0087722 A1* | 4/2009 | Sakabe | B60L 3/0046 429/61 |
| 2010/0201317 A1* | 8/2010 | Shiu | H02J 7/0018 320/116 |
| 2012/0182024 A1* | 7/2012 | Ike | G01R 31/025 324/509 |
| 2012/0183813 A1 | 7/2012 | Kim | |
| 2015/0042277 A1* | 2/2015 | Tang | B60L 11/1816 320/109 |
| 2016/0049813 A1* | 2/2016 | Takizawa | H01M 10/441 320/112 |
| 2016/0301224 A1* | 10/2016 | Kim | H02J 7/0031 |
| 2017/0003353 A1* | 1/2017 | Seo | G01R 31/3624 |
| 2017/0170653 A1* | 6/2017 | Song | H02H 9/025 |

\* cited by examiner

BATTERY PACK AND DRIVING METHOD THEREOF

CROSS-REFERENCE TO RELATED APPLICATION

This application claims priority to and the benefit of Korean Patent Application No. 10-2015-0023429, filed on Feb. 16, 2015, in the Korean Intellectual Property Office, the entire content of which is incorporated herein by reference in its entirety.

BACKGROUND

1. Field

One or more aspects of example embodiments relate to a battery pack and a driving method thereof.

2. Description of the Related Art

Due to problems of environment destruction, resource exhaustion, and the like, there is an increasing demand for a system capable of efficiently using stored power. Also, there is an increasing demand for new renewable energy that does not cause pollution or causes only little pollution during power generation. An energy storage system is a system that connects new renewable energy, a battery system for storing power, and an existing grid to each other. Much research has been conducted to conform to environmental changes.

One of the important factors for such energy storage system may be efficient management of the battery system including charging, discharging, cell balancing, and the like. A battery may be used for a long time by effectively managing the battery, and power may be provided to a load in a stable manner.

A battery, with switches that control charging and discharging thereof, may be typically provided in the form of a battery pack. Various proposals are being made to efficiently and safely charge and discharge batteries.

The above information disclosed in this Background section is only for enhancement of understanding of the background of the invention, and therefore, it may contain information that does not form prior art.

SUMMARY

According to an embodiment, a battery pack includes: a chargeable battery; a first terminal part including a positive terminal coupled to a positive pole of the battery and a negative terminal coupled to a negative pole of the battery; a charge control switch and a discharge control switch between the positive pole and the positive terminal of the battery; and a protector configured to measure a voltage of the first terminal part, to control the charge control switch and the discharge control switch to operate normally when the voltage of the first terminal part is greater than or equal to a voltage of a reference power, and to control the charge control switch and the discharge control switch to be turned off when the voltage of the first terminal part is less than the voltage of the reference power.

The protector may be configured to compare a voltage of the positive terminal with the voltage of the reference power.

The battery pack may further include: a charge controller configured to turn on and turn off the charge control switch; a discharge controller configured to turn on and turn off the discharge control switch; and a battery management system configured to control the charge controller and the discharge controller.

The protector may include a comparator configured to compare a voltage of the positive terminal with the voltage of the reference power, and the battery management system may be configured to control the charge controller and the discharge controller in response to a comparison result of the comparator.

The protector may include: a comparator configured to compare a voltage of the positive terminal with the voltage of the reference power, and to generate a control signal when the voltage of the positive terminal is greater than or equal to the voltage of the reference power; and a plurality of controllers coupled to the charge controller and the discharge controller, respectively, the plurality of controllers being configured to couple the charge controller and the discharge controller to the battery management system when the control signal is supplied, and to electrically disconnect the charge controller and the discharge controller from the battery management system when the control signal is not supplied.

The protector may include: a comparator configured to compare a voltage of the positive terminal and the voltage of the reference power, and to generate a control signal when the voltage of the positive terminal is greater than or equal to the voltage of the reference power; and a plurality of controllers coupled to the charge control switch and the discharge control switch, respectively, and configured to couple the charge control switch to the charge controller and the discharge control switch to the discharge controller when the control signal is supplied.

The battery pack may further include: a pre-charger coupled in parallel to the charge control switch and the discharge control switch, and configured to supply current to the first terminal part.

The pre-charger may include: pre-charge switches configured to be turned on when current is supplied to the first terminal part; and a first resistor coupled between the pre-charge switches and the positive terminal.

The first terminal part may be coupled to a second terminal part at an exterior, and the second terminal part may include: a first terminal coupled to the positive terminal; a second terminal coupled to the negative terminal; and a first capacitor coupled between the first terminal and the second terminal.

The pre-charger may be configured to pre-charge the first capacitor to a voltage greater than or equal to the voltage of the reference power.

The voltage of the reference power may be set to a voltage that may be greater than or equal to i/2 when a maximum voltage capacity of the first capacitor is equal to i (where i is a natural number).

According to another embodiment, a method for driving a battery pack including: a first terminal part including a positive terminal coupled to a positive pole and a negative terminal coupled to a negative pole; and a charge control switch and a discharge control switch between the positive pole of the battery and the positive terminal, the method includes: detecting a voltage of the first terminal part; and maintaining the charge control switch and the discharge control switch in a turn off state when the voltage of the first terminal part is lower than a voltage of a reference power.

The detecting of the voltage of the first terminal part may include comparing a voltage applied to the positive terminal with the voltage of the reference power.

BRIEF DESCRIPTION OF THE DRAWINGS

The above and other aspects and features of the present invention will become apparent to those skilled in the art from the following detailed description of the example embodiments with reference to the accompanying drawings.

DETAILED DESCRIPTION

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
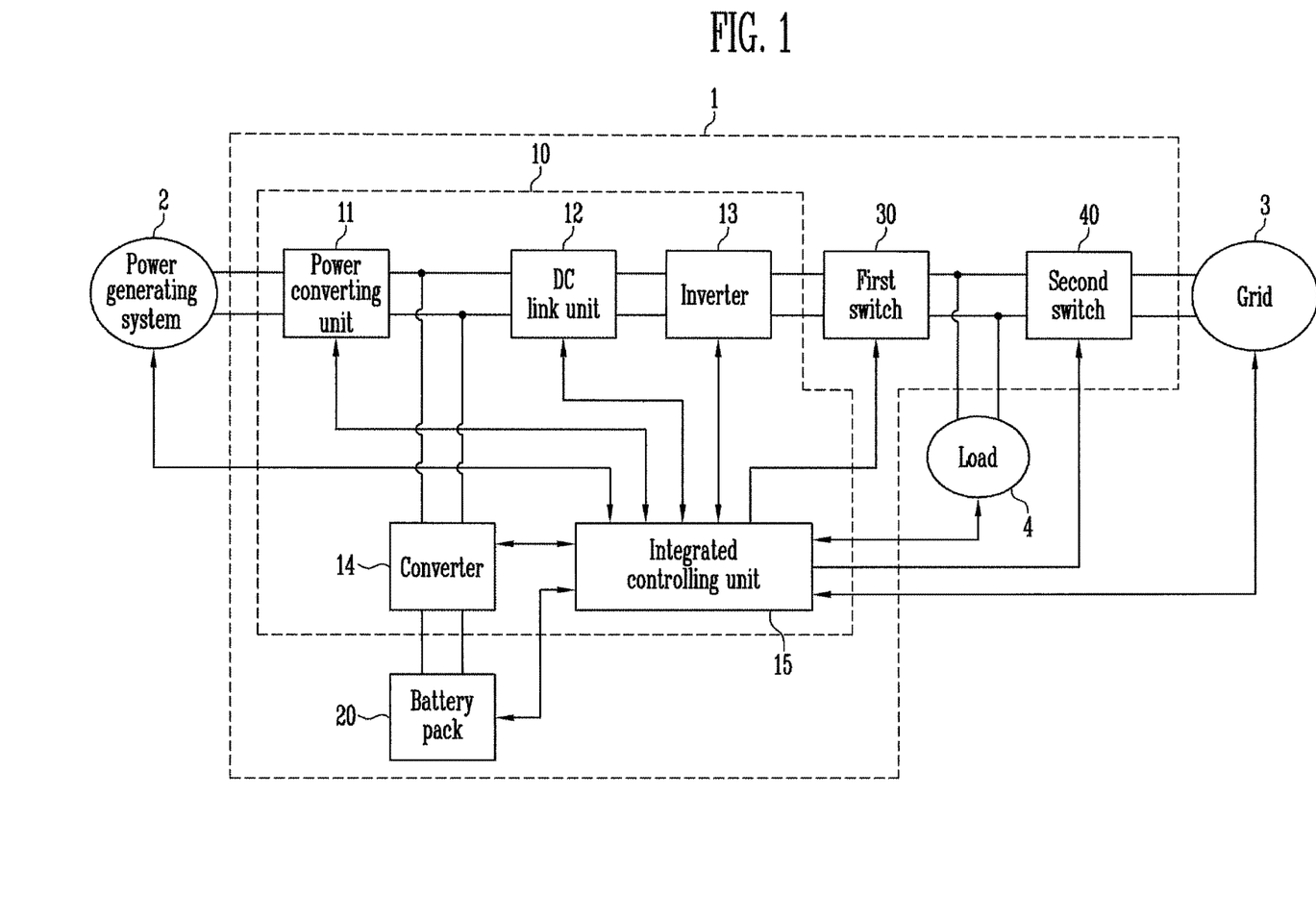
FIG. 1 illustrates an energy storage system according to an embodiment.

FIG. 1 illustrates an energy storage system according to an embodiment.

Referring to FIG. 1, an energy storage system 1 according to an embodiment may supply power to a load 4 by linking with a power generating system 2 and a grid 3.

The power generating system 2 may be a system that generates power using an energy source. The power generating system 2 may supply the generated power to the energy storage system 1. The power generating system 2 may include a solar power generating system, a wind power generating system, a tidal power generating system, etc. However, the power generating system 2 is not limited to the above. For example, the power generating system 2 may include any suitable power generators using new, renewable energy to generate power, such as solar heat, geothermal heat, etc. For example, a solar cell that generates electrical energy using sunlight may be easy to install at family homes, factories, etc., and may be suitable for the energy storage system 1 dispersed throughout the homes or factories.

A grid 3 may include a power plant, a substation, a power line, and/or the like. The grid 3, in its normal state, may supply power to the energy storage system 1 that may be supplied to a load 4 and/or a battery system 20, and the energy storage system 1 may supply power to the grid 3. When the grid 3 is in its abnormal state, power supply from the grid 3 to the energy storage system 1 is stopped, and power supply from the energy storage system 1 to the grid 3 is also stopped.

The load 4 may consume power generated from the power generating system 2, power stored in the battery system 20, and/or power supplied from the grid 3. A family home, a factory, or the like may be an example of the load 4.

The energy storage system 1 may store power generated by the power generating system 2 in the battery pack 20, and/or may supply the generated power to the grid 3. Also, the energy storage system 1 may supply the power stored in the battery pack 20 to the grid 3, and/or store the power supplied from the grid 3 in the battery pack 20. The energy storage system 1 may include a power conversion system (PCS) 10 to control power conversion, the battery pack 20, a first switch 30, and a second switch 40.

The PCS 10 may properly convert and supply power of the power generating system 2, the grid 3, and the battery pack 20 to where it is needed. For example, the PCS 10 may include a power converting unit (e.g., a power converter) 11, a direct current (DC) link unit (or a DC link) 12, an inverter 13, a converter 14, and an integrated controlling unit (e.g., an integrated controller) 15.

The power converting unit 11 may include a power converting device located between the power generating system 2 and the DC link unit 12. The power converting unit 11 may transfer power generated from the power generating system 2 to the DC link unit 12, and may convert an output voltage into a DC link voltage.

The power converting unit 11 may be configured as a converter, a rectifier circuit, etc., depending on a type (kind) of the power generating system 2. When the power generated by the power generating system 2 includes a DC, the power converting unit 11 may be configured as a converter for converting a DC into a DC. When the generated power includes an alternating current (AC), the power converting unit 11 may be configured as a current circuit for converting an AC into a DC. In the case that the power generating system 2 is a solar power generating system, the power converting unit 11 may include a maximum power point tracking (MPPT) converter for performing MPPT control so as to maximally obtain power generated by the power generating system 2 according to a change in solar radiation intensity, temperature, etc.

The DC link unit 12 may be coupled between the power converting unit 11 and the inverter 13, and may maintain or substantially maintain the DC link voltage steadily. The DC link unit 12 may include, for example, a high-capacity capacitor, etc.

The inverter 13 may include a power converting device coupled between the DC link unit 12 and the first switch 30. In a discharge mode, the inverter 13 may convert a DC link voltage output from the power generating system 2 and/or the battery pack 20 into an AC voltage and may output the AC voltage. Also, in a charge mode, the inverter 13 may convert an AC voltage from the grid 3 into a DC link voltage and may output the DC link voltage. The inverter 13 may include a filter for removing high frequencies from the AC voltage, a phase locked loop (PLL) for phase synchronizing, etc.

The converter 14 may include a power converting device coupled between the DC link unit 12 and the battery pack 20. In a discharge mode, the converter 14 may DC-DC convert power stored in the battery pack 20 into the DC link voltage used by the inverter 13 and may output the DC link voltage. In a charge mode, the converter 14 may DC-DC convert voltage of the power output from the power converting unit 11 and/or the inverter 13 into a voltage that may be stored in the battery pack 20 (that is, a charge voltage) and may output the voltage.

The integrated controlling unit 15 may monitor the power generating system 2, the grid 3, the battery pack 20, the load 4, etc., and may control operations of the power converting unit 11, the DC link unit 12, the inverter 13, the converter 14, the battery pack 20, the first switch 30, and the second switch 40 based on monitoring results and pre-configured algorithms, etc.

The first switch 30 and the second switch 40 may be coupled in series between the inverter 13 and the grid 3, and may perform ON/OFF operations according to control of the integrated controlling unit 15. The first switch 30 and the second switch 40 may control flow of a current between the power generating system 2 and the grid 3. ON/OFF states of the first switch 30 and the second switch 40 may be determined according to the operating status of the power generating system 2, the grid 3, and the battery system 20.

When power of the power generating system 2 and/or the battery pack 20 is supplied to the load 4, or when power of the grid 3 is supplied to the battery pack 20, the first switch 30 may be ON. When the power of the power generating system 2 and/or the battery pack 20 is supplied to the grid 3, or when the power of the grid 3 is supplied to the load 4 and/or the battery pack 20, the second switch 40 is ON. The first switch 30 and the second switch 40 may include a switching device, such as a relay, etc., which may be configured to withstand a large current.

The battery pack 20 may receive and store the power of the power generating system 2 and/or the grid 3, and may supply the stored power to the load 4 or the grid 3.

Figure 2:
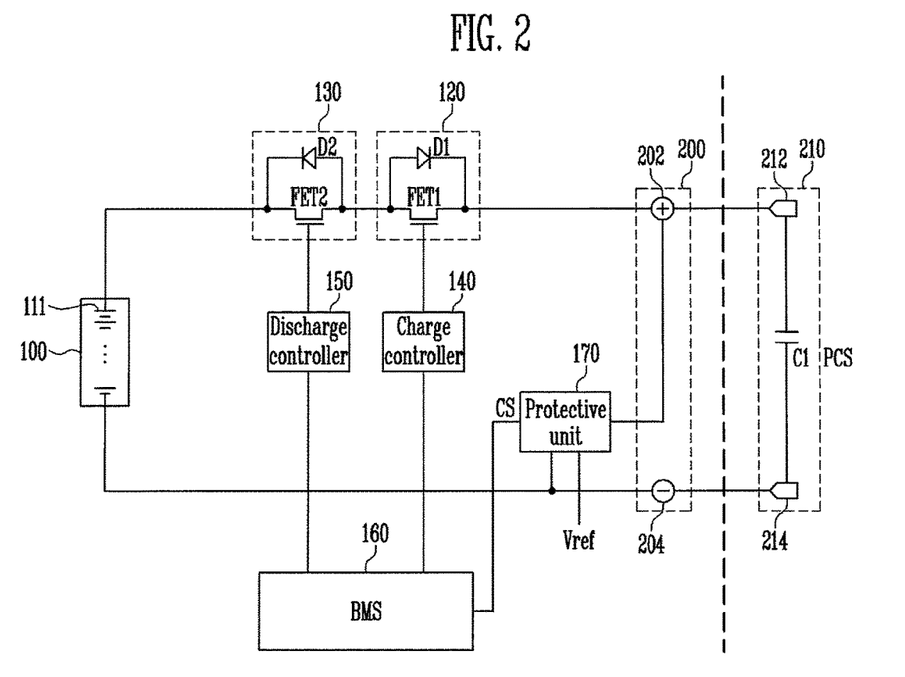
FIG. 2 illustrates a battery back according to a first embodiment.

FIG. 2 illustrates a battery pack according to a first embodiment.

Referring to FIG. 2, the battery pack according to the first embodiment may include a battery 100, a charge control switch 120, a discharge control switch 130, a charge controller 140, a discharge controller 150, a battery management system (BMS) 160, a protective unit (e.g., a protector) 170, and a first terminal part 200.

The battery 100 may supply stored power to a PCS 10 via the first terminal part 200. Also, the battery 100 may be charged by a current (e.g., an external current) supplied from the PCS 10 via the first terminal part 200. The battery 100 may include at least one battery cell 111. The battery cell 111 may be a secondary battery that is capable of being charged, such as a nickel-cadmium battery, a lead storage battery, a nickel metal hydride battery, a lithium ion battery, a lithium polymer battery, and/or the like.

A charge control switch 120 and a discharge control switch 130 may control flow of a charge current and a discharge current, respectively. The charge control switch 120 may control the flow of the charge current, and the discharge control switch 130 may control the flow of the discharge current.

The charge control switch 120 may include a first field effect transistor FET1 and a first parasitic diode D1. The first field effect transistor FET1 may limit current flow from a first terminal part 200 to the battery 100 in response to control of the charge controller 140. The charge controller 140 may control the flow of the charge current by controlling the turning ON and turning OFF of the first field effect transistor FET1. The first parasitic diode D1 may be coupled to the first field effect transistor FET1 to cause the discharge current to flow from the battery 100 to the first terminal part 200.

The discharge control switch 130 may include a second field effect transistor FET2 and a second parasitic diode D2. The second field effect transistor FET2 may limit the current flow from the battery 100 to the first terminal part 200 in response to the control of the discharge controller 150. The discharge controller 150 may control the flow of the discharge current by controlling the turning ON and turning OFF of the second field effect transistor FET2. The second parasitic diode D2 may be coupled to the second field effect transistor FET2 to cause the charge current to flow from the first terminal part 200 to the battery 100.

The charge controller 140 may control the turning ON and turning OFF of the charge control switch 120 in response to control of the BMS 160. The charge controller 140 may turn ON the charge control switch 120 at the time of charging the battery 100.

The discharge controller 150 may control the turning ON and turning OFF of the discharge control switch 130 in response to the control of the BMS 160. The discharge controller 150 may turn ON the discharge control switch 130 at the time of discharging the battery 100.

The BMS 160 may perform balancing of the battery cell(s) 111 and the like. The BMS 160 may control the turning ON and turning OFF of the charge control switch 120 and the discharge control switch 130 by controlling the charge controller 140 and the discharge controller 150, respectively. The BMS 160 may control the charge control switch 120 and the discharge control switch 130 to operate in a normal state when a control signal CS is input from a protective unit (e.g., a protector) 170, and may control the charge control switch 120 and the discharge control switch 130 to be turned OFF when the control signal CS is not input.

The first terminal part 200 may couple the battery pack to an external device. For example, but without limitation thereto, the first terminal part 200 may be electrically coupled to a second terminal part 210. The second terminal part 210 may be configured as a terminal part of the converter 14, for example. The first terminal part 200 may be electrically coupled to the PCS 10 via the second terminal part 210.

The first terminal part 200 may include a positive terminal 202 and a negative terminal 204. The positive terminal 202 may be coupled to a positive pole of the battery 100 via the charge control switch 120 and the discharge control switch 130. The negative terminal 204 may be coupled to a negative pole of the battery 100.

The second terminal part 210 coupled to the first terminal part 200 may include a first terminal 212 coupled to the positive terminal 202 of the first terminal part 200, and a second terminal 214 coupled to the negative terminal 204. The second terminal part 210 may include a first capacitor C1 coupled between the first terminal 212 and the second terminal 214. The first capacitor C1 may charge a voltage (e.g., a predetermined voltage) due to the power that is supplied from the battery pack and/or the PCS.

The protective unit 170 may compare the voltage applied to the first terminal part 200 and a voltage of reference power Vref, and may generate the control signal CS in response to the result of the comparison.

The protective unit 170 may compare a voltage applied to the positive terminal 202 (i.e., a voltage between the positive terminal 202 and the negative terminal 204) and the voltage of the reference power Vref. When the voltage of the positive terminal 202 is greater than or equal to the voltage of the reference power Vref, the protective unit 170 may generate the control signal CS. Otherwise, the protective unit 170 may not generate the control signal CS. Here, the control signal CS being generated may refer to a certain voltage, for example, a high voltage being output from the protective unit 170. Also, the control signal CS not being generated may refer to a voltage having a voltage level different from (e.g., opposite to) the certain voltage, for example, a low voltage being output from the protective unit 170.

The BMS 160 may set the charge control switch 120 and the discharge control switch 130 to a turn OFF state by controlling the charge controller 140 and the discharge controller 150, respectively, when the control signal CS is not input from the protective unit 170. The BMS 160 may control the charge controller 140 and the discharge controller 150, such that the charge control switch 120 and/or the discharge control switch 130 may operate in a normal state when the control signal CS is input from the protective unit 170.

When the voltage of the positive terminal 202 is set to a voltage of the reference power Vref or greater, the charge control switch 120 and the discharge control switch 130 may be normally controlled. Otherwise, the charge control switch 120 and the discharge control switch 130 may be set to a turn OFF state.

When the first terminal part 200 and the second terminal part 210 are coupled to each other, the voltage that is stored in the first capacitor C1 may be supplied to the positive terminal 202. When a high voltage (for example, a voltage of the reference power Vref or greater) is charged in the first capacitor C1, the amount of current does not rapidly (e.g., instantaneously) increase, even though the charge control switch 120 or the discharge control switch 130 may be turned ON.

However, if a low voltage (for example, a voltage that is less than the reference power Vref) is charged in the first capacitor C1, the amount of the current rapidly increases in response to the turning ON of the charge control switch 120 or the discharge control switch 130, and accordingly, the charge control switch 120 or the discharge control switch 130 may be damaged. Consequently, the voltage of the first terminal part 200 may be measured using the protective unit 170, and operations of the charge control switch 120 and the discharge control switch 130 may be controlled in response to the measurement result, thereby securing stability.

The voltage of the reference power Vref may be set to a voltage that is equal to or greater than i/2 when the maximum voltage that can be charged in the first capacitor C1 is set to i (where i is a natural number). For example, if the maximum voltage that can be charged in the first capacitor C1 is set to 48V, the voltage of the reference power Vref may be set to a voltage that is 24V or greater, for example, 26V.

Figure 3:
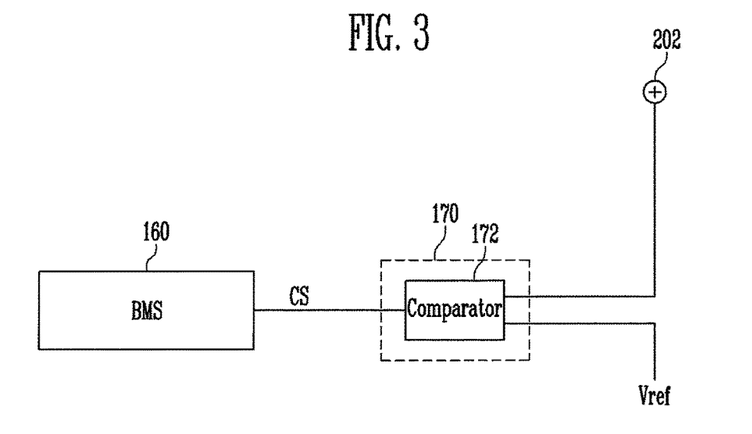
FIG. 3 illustrates an embodiment of the protective unit shown in FIG. 2.

FIG. 3 illustrates an embodiment of the protective unit shown in FIG. 2.

Referring to FIG. 3, a protective unit (e.g., a protector) 170 according to an embodiment may include a comparator 172. The comparator 172 may compare a voltage of a positive terminal 202 and a voltage of reference power Vref. When the voltage of the positive terminal 202 is set to the voltage of the reference power Vref or greater, a control signal CS may be generated. Otherwise, the control signal CS may not be generated.

Figure 4:
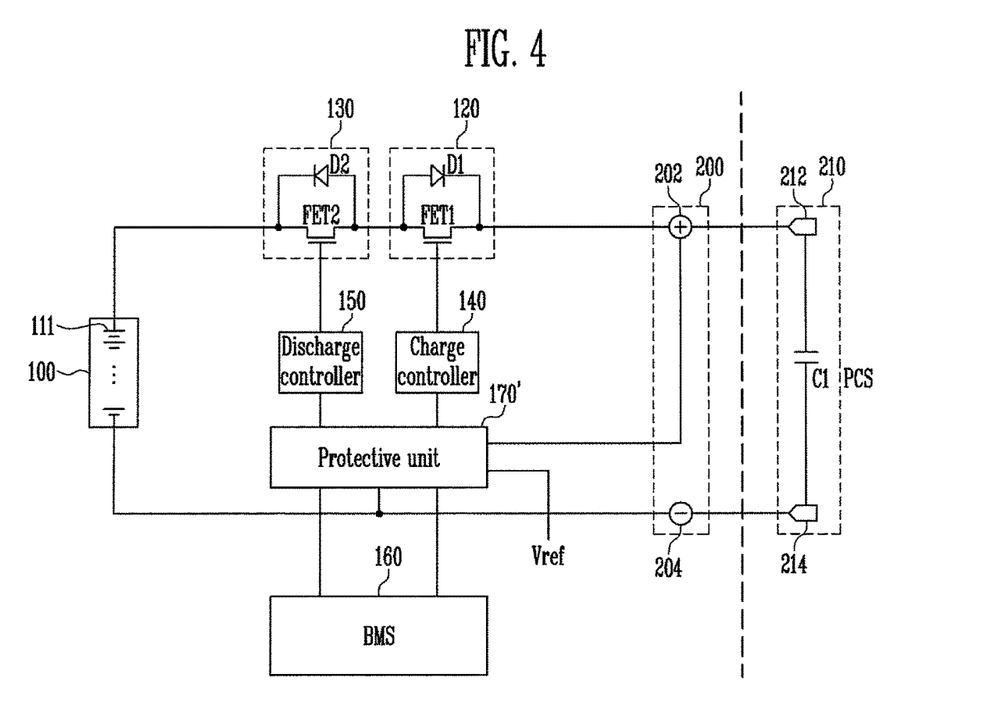
FIG. 4 illustrates a battery pack according to a second embodiment.

FIG. 4 illustrates a battery pack according to a second embodiment. With reference to FIG. 4, the same or substantially the same elements or components as shown in FIG. 2 have the same reference numerals, and the corresponding detailed description may be omitted.

Referring to FIG. 4, the battery pack according to the second embodiment may measure a voltage of a first terminal part 200, and may include a protective unit (e.g., a protector) 170' for selectively coupling a charge controller 140 and a discharge controller 150 to a BMS 160 in response to the measured voltage.

The protective unit 170' may compare a voltage of a positive terminal 202 and a voltage of reference power Vref, and when the voltage of the reference power Vref is greater than the voltage of the positive terminal 202, the charge controller 140 and the discharge controller 150 may be electrically disconnected (e.g., electrically isolated) from the BMS 160. The protective unit 170' may compare the voltage of the positive terminal 202 and the voltage of the reference power Vref, and when the voltage of the positive terminal 202 is set to the reference power Vref or greater, the charge controller 140 and the discharge controller 150 may be electrically coupled to the BMS 160.

When the BMS 160 and the charge controller 140 and/or the discharge controller 150 are electrically coupled to each other, the charge controller 140 and the discharge controller 150 may operate in a normal state in response to a signal of the BMS 160, and accordingly, a charge control switch 120 and a discharge control switch 130 may be turned ON or turned OFF in response to control of the charge controller 140 and the discharge controller 150, respectively.

Figure 5:
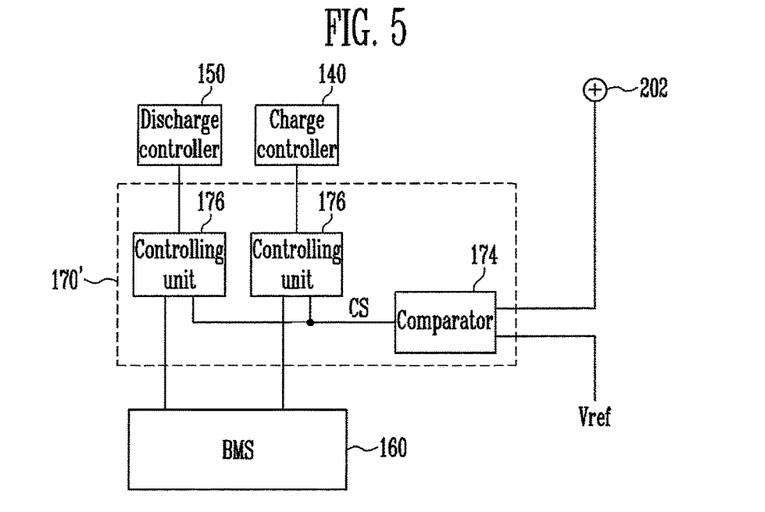
FIG. 5 illustrates an embodiment of the protective unit shown in FIG. 4.

FIG. 5 illustrates an embodiment of the protective unit shown in FIG. 4.

Referring to FIG. 5, a protective unit (e.g., a protector) 170' according to an embodiment may include a comparator 174 and controlling units (e.g., controllers) 176.

The comparator 174 may compare a voltage of a positive terminal 202 and a voltage of reference power Vref. When the voltage of the positive terminal 202 is set to the voltage of the reference power Vref or greater, the comparator 174 may output a high voltage (that is, a control signal CS), or otherwise may output a low voltage.

The controllers 176 may be coupled to a charge controller 140 and a discharge controller 150, respectively. The controllers 176 may couple a BMS 160 to the charge controller 140 and the discharge controller 150, when the control signal CS is supplied from the comparator 174. The controllers 176 may electrically disconnect (e.g., electrically isolate) the BMS 160 from the charge controller 140 and the discharge controller 150, when the control signal CS is not supplied from the comparator 174. Each of the controllers 176 may be configured as a switching device or a logic gate, such as an AND gate.

Figure 6:
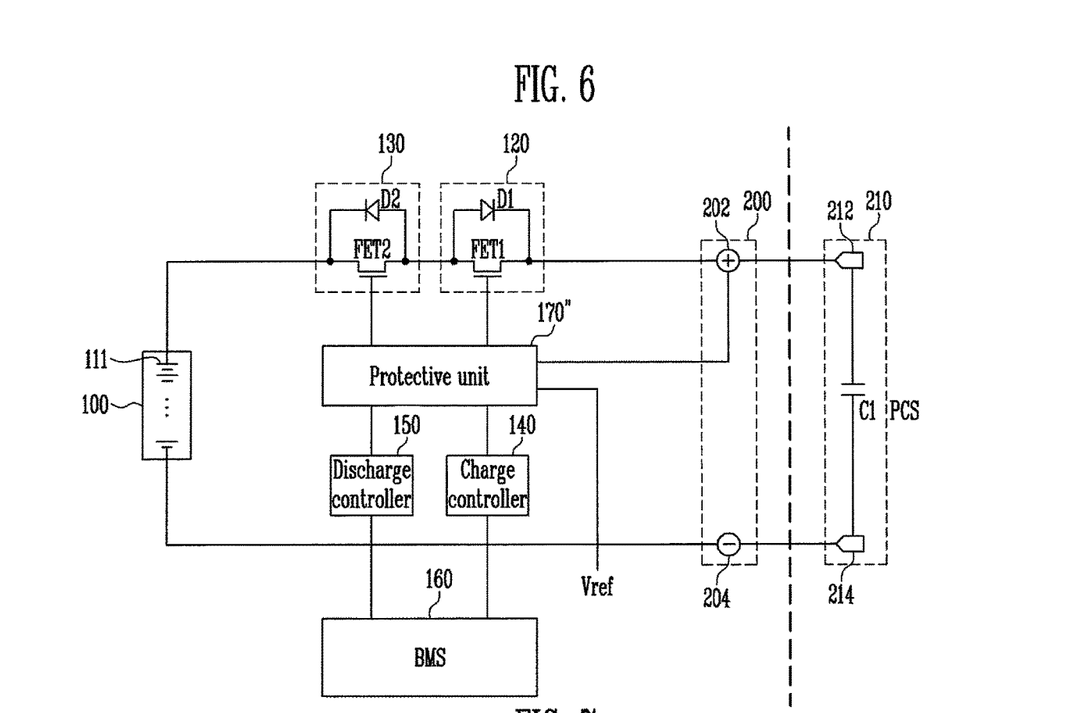
FIG. 6 illustrates a battery pack according to a third embodiment.

FIG. 6 illustrates a battery pack according to a third embodiment. With reference to FIG. 6, the same or substantially the same components or elements as shown in FIG. 2 have the same reference numerals, and the corresponding detailed description may be omitted.

Referring to FIG. 6, the battery pack according to a third embodiment may include a protective unit (e.g., a protector) 170" to measure a voltage of a first terminal part 200, and to selectively couple a charge controller 140 to a charge control switch 120 and a discharge controller 150 to a discharge control switch 130 in response to the measured voltage. The protective unit 170" may compare the voltage of the positive terminal 202 and the voltage of the reference power Vref, and may electrically disconnect (e.g., electrically isolate) the charge controller 140 and the discharge controller 150 from the charge control switch 120 and the discharge control switch 130, respectively, when the voltage of the reference power Vref is higher than the voltage of the positive terminal 202. The protective unit 170" may electrically couple the charge controller 140 to the charge control switch 120 and the discharge controller 150 to the discharge control switch 130 when the voltage of the positive terminal 202 is set to the voltage of the reference power Vref or greater.

When the charge control switch 120 is coupled to the charge controller 140 and the discharge control switch 130 is coupled to the discharge controller 150, the charge control switch 120 and the discharge control switch 130 may operate in a normal state in response to control of the charge controller 140 and the discharge controller 150.

Figure 7:
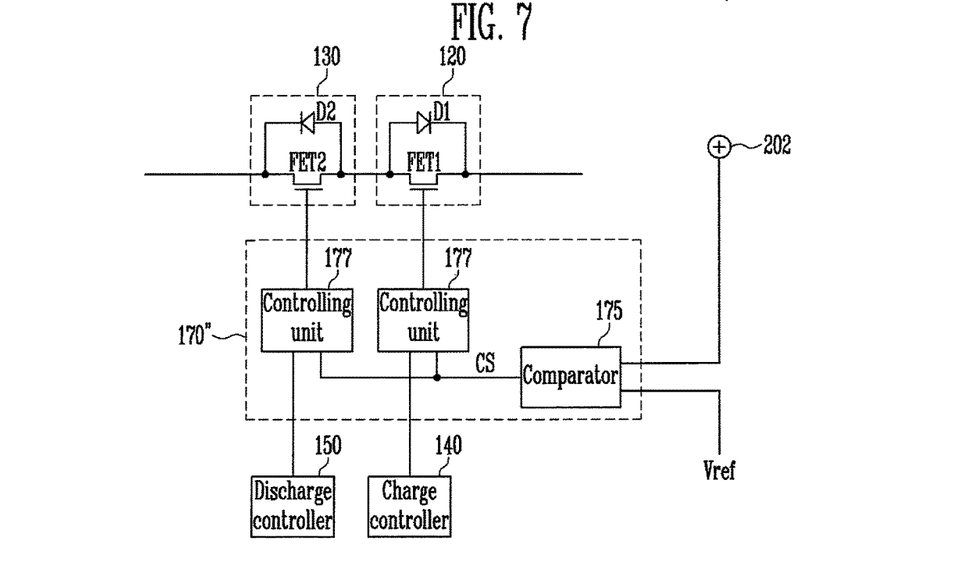
FIG. 7 illustrates an embodiment of the protective unit shown in FIG. 6.

FIG. 7 illustrates an embodiment of the protective unit shown in FIG. 6.

Referring to FIG. 7, the protective unit 170" according to an embodiment may include a comparator 175 and controlling units (e.g., controllers) 177.

The comparator 175 may compare a voltage of a positive terminal 202 and a voltage of a reference power Vref. The comparator 175 may output a high voltage (that is, a control signal CS) when the voltage of the positive terminal 202 is set to the voltage of the reference power Vref or greater, and otherwise, may output a low voltage.

The controllers 177 may be coupled to a charge control switch 120 and a discharge control switch 130, respectively. The controllers 177 may couple the charge controller 140 and the discharge controller 150 to the charge control switch 120 and the discharge control switch 130, respectively, when the control signal CS is supplied form the comparator 175. The controllers 177 may electrically disconnect (e.g., electrically isolate) the charge controller 140 and the discharge controller 150 from the charge control switch 120 and the discharge control switch 130, when the control signal CS is not supplied form the comparator 175. Each of the controllers 177 may be configured as a switching device or a logic gate, such as an AND gate.

Figure 8:
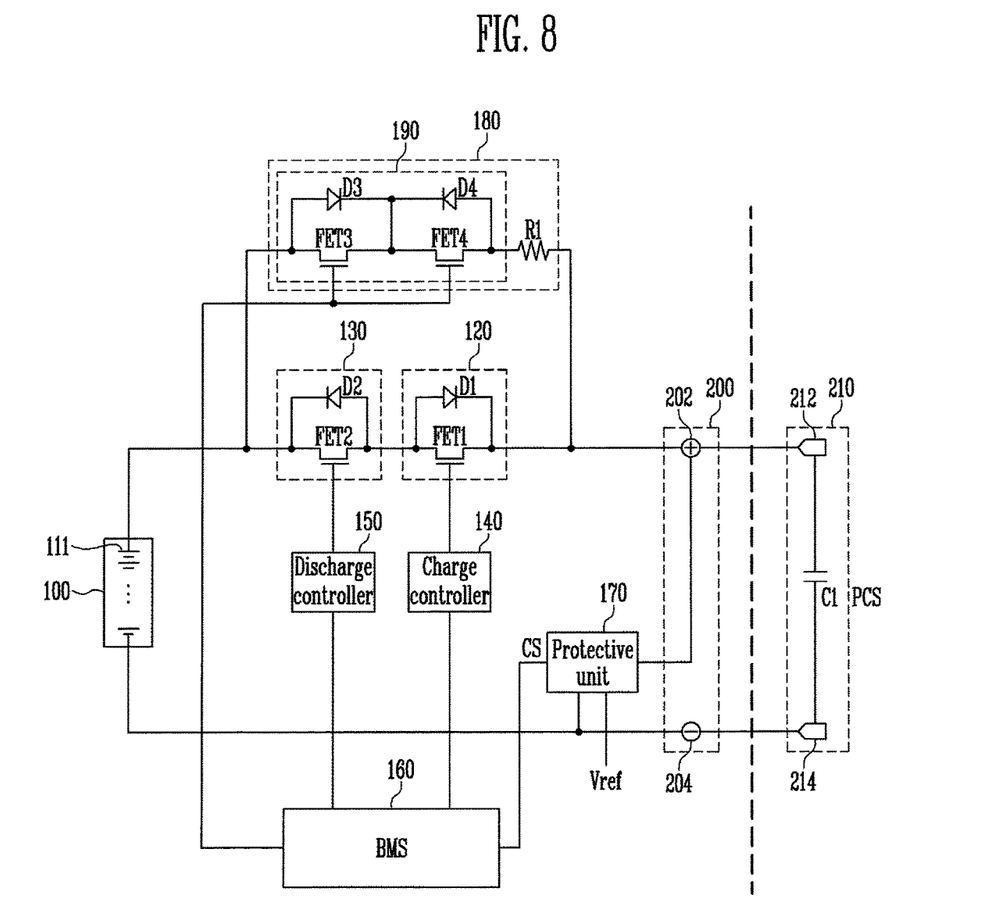
FIG. 8 illustrates a battery pack according to a fourth embodiment.

FIG. 8 illustrates a battery pack according to a fourth embodiment. With reference to FIG. 8, the same or substantially the same components or elements as shown in FIG. 2 have the same reference numerals, and the corresponding detailed description may be omitted.

Referring to FIG. 8, the battery pack according to the fourth embodiment may include a pre-charge unit (e.g., a pre-charger) 180 that is coupled in parallel to a charge control switch 120 and a discharge control switch 130.

The pre-charge unit 180 may pre-charge a first capacitor C1 using a voltage stored in a battery 100. For example, when a first terminal part 200 and a second terminal part 210 are coupled to each other, the pre-charge unit 180 may supply a current (e.g., a predetermined current) to the first terminal part 200 in response to a voltage of the battery 100. The first capacitor C1 may be pre-charged in response to the current supplied from the first terminal part 200.

When the first capacitor C1 is pre-charged using the pre-charge unit 180, the likelihood of damaging the charge control switch 120 and the discharge control switch 130 due to a sudden current may be reduced. In addition, the voltage of the first terminal part 200 may be detected using a protective unit (e.g., a protector) 170, and operations of the charge control switch 120 and the discharge control switch 130 may be controlled in response to the detection results, thereby securing reliability.

The precharge unit 180 may include a switching unit (e.g., a switching circuit) 190 and a resistor R1 that are coupled in series between the battery 100 and the positive terminal 202.

The switching unit 190 may include a first pre-charge switch and a second pre-charge switch. The first pre-charge switch may include a third field effect transistor FET3 and a third parasitic diode D3. The third field effect transistor FET3 may be turned ON due to control of a BMS 160. The third parasitic diode D3 may be coupled to the third field effect transistor FET3 to allow current to flow from the battery 100 to the positive terminal 202.

The second pre-charge switch may include a fourth field effect transistor FET4 and a fourth parasitic diode D4. The fourth field effect transistor FET4 may be turned ON and/or turned OFF concurrently with the third field effect transistor FET3 in response to the control of the BMS 160. The fourth parasitic diode D4 may be coupled to the fourth field effect transistor FET4 to allow a current to flow from the positive terminal 202 to the battery 100.

The resistor R1 may be coupled between the switching unit 190 and the positive terminal 202. The resistor R1 may limit the flow of the current, thereby preventing or substantially preventing the first pre-charge switch and the second pre-charge switch from being damaged. The pre-charge unit 180 shown in FIG. 8 may be applied to any ones of the battery packs according to the embodiments shown in FIGS. 4 and 6.

Example embodiments have been disclosed herein, and although specific terms are employed, they are used and are to be interpreted in a generic and descriptive sense only, and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments, unless otherwise specifically indicated. Accordingly, it will be understood by those of skill in the art that various changes in form and details may be made without departing from the spirit and scope of the present invention as set forth in the following claims, and their equivalents.

What is claimed is:

1. A battery pack, comprising:
   a chargeable battery;
   a first terminal part comprising a positive terminal coupled to a positive pole of the battery and a negative terminal coupled to a negative pole of the battery;
   a charge control switch and a discharge control switch between the positive pole of the battery and the positive terminal;
   a protector configured to measure a voltage of the first terminal part, to control the charge control switch and the discharge control switch to operate normally when the voltage of the first terminal part is greater than or equal to a voltage of a reference power, and to control the charge control switch and the discharge control switch to be turned off when the voltage of the first terminal part is less than the voltage of the reference power;
   a charge controller configured to turn on or turn off the charge control switch;
   a discharge controller configured to turn on or turn off the discharge control switch; and
   a battery management system configured to control the charge controller and the discharge controller.

2. The battery pack as claimed in claim 1, wherein the protector is configured to compare a voltage of the positive terminal with the voltage of the reference power.

3. The battery pack as claimed in claim 1,
   wherein the protector comprises a comparator configured to compare a voltage of the positive terminal with the voltage of the reference power, and
   wherein the battery management system is configured to control the charge controller and the discharge controller in response to a comparison result of the comparator.

4. The battery pack as claimed in claim 1, wherein the protector comprises:
   a comparator configured to compare a voltage of the positive terminal with the voltage of the reference power, and to generate a control signal when the voltage of the positive terminal is greater than or equal to the voltage of the reference power; and
   a plurality of controllers coupled to the charge controller and the discharge controller, respectively, the plurality of controllers being configured to couple the charge controller and the discharge controller to the battery management system when the control signal is supplied, and to electrically disconnect the charge controller and the discharge controller from the battery management system when the control signal is not supplied.

5. The battery pack as claimed in claim 1, wherein the protector comprises:
   a comparator configured to compare a voltage of the positive terminal and the voltage of the reference power, and to generate a control signal when the voltage of the positive terminal is greater than or equal to the voltage of the reference power; and
   a plurality of controllers coupled to the charge control switch and the discharge control switch, respectively, and configured to couple the charge control switch to the charge controller and the discharge control switch to the discharge controller when the control signal is supplied.

6. The battery pack as claimed in claim 1, further comprising:
a pre-charger coupled in parallel to the charge control switch and the discharge control switch, and configured to supply current to the first terminal part.

7. The battery pack as claimed in claim 6, wherein the pre-charger comprises:
pre-charge switches configured to be turned on when current is supplied to the first terminal part; and
a first resistor coupled between the pre-charge switches and the positive terminal.

8. The battery pack as claimed in claim 6,
wherein the first terminal part is coupled to a second terminal part at an exterior, and
wherein the second terminal part comprises:
a first terminal coupled to the positive terminal;
a second terminal coupled to the negative terminal; and
a first capacitor coupled between the first terminal and the second terminal.

9. The battery pack as claimed in claim 8, wherein the pre-charger is configured to pre-charge the first capacitor to a voltage greater than or equal to the voltage of the reference power.

10. The battery pack as claimed in claim 8, wherein the voltage of the reference power is set to a voltage that is greater than or equal to i/2 when a maximum voltage capacity of the first capacitor is equal to i (where i is a natural number).

11. A method for driving a battery pack, the battery pack comprising:
a first terminal part comprising a positive terminal coupled to a positive pole of a battery and a negative terminal coupled to a negative pole of the battery;
a charge control switch and a discharge control switch between the positive pole of the battery and the positive terminal;
a charge controller configured to turn on or turn off the charge control switch;
a discharge controller configured to turn on or turn off the discharge control switch; and
a battery management system configured to control the charge controller and the discharge controller,
the method comprising:
detecting a voltage of the first terminal part; and
maintaining the charge control switch and the discharge control switch in a turn off state when the voltage of the first terminal part is lower than a voltage of a reference power.

12. The method as claimed in claim 11, wherein the detecting of the voltage of the first terminal part comprises comparing a voltage applied to the positive terminal with the voltage of the reference power.

* * * * *